United States Patent [19]

Kihara et al.

[11] 3,911,483

[45] Oct. 7, 1975

[54] APPARATUS AND METHOD FOR RECORDING AND REPRODUCING A VIDEO SIGNAL IN SUCCESSIVE RECORD TRACKS ON A RECORD SHEET WITHOUT GUARD BANDS BETWEEN ADJACENT TRACKS

[75] Inventors: Nobutoshi Kihara; Yukihiko Machida, both of Tokyo, Japan

[73] Assignee: Sony Corporation, Tokyo, Japan

[22] Filed: Dec. 18, 1973

[21] Appl. No.: 425,845

[30] Foreign Application Priority Data

Dec. 23, 1972 Japan .................................. 48-621

[52] U.S. Cl. ...................... 360/33; 360/77; 360/75; 360/122

[51] Int. Cl.².. H04H 5/78; G11B 5/22; G11B 21/10

[58] Field of Search........... 178/6.6 DD; 360/33, 76, 360/77, 137, 122, 97, 75, 78, 118; 346/138

[56] References Cited

UNITED STATES PATENTS

| | | | |
|---|---|---|---|
| 1,792,264 | 2/1931 | Alexanderson | 346/108 |
| 3,157,738 | 11/1964 | Okamura | 178/6.6 DD |
| 3,234,325 | 2/1966 | Backers | 360/33 |
| 3,478,177 | 11/1969 | Morita | 360/118 |
| 3,509,274 | 4/1970 | Kihara | 178/6.6 DD |
| 3,539,712 | 11/1970 | Stephens | 360/33 |
| 3,624,284 | 11/1971 | Russell | 178/6.7 A |
| 3,626,087 | 12/1971 | Tomioka | 360/33 |
| 3,701,846 | 10/1972 | Zenzefilis | 360/97 |

*Primary Examiner*—Vincent P. Canney
*Assistant Examiner*—Alan Faber
*Attorney, Agent, or Firm*—Lewis H. Eslinger; Alvin Sinderbrand

[57] ABSTRACT

Video signals are recorded in successive record tracks on a record sheet without guard bands or spaces between adjacent tracks so as to enhance the utilization of the record sheet, and interference between the signals recorded in adjacent tracks is avoided during reproduction thereof by recording such video signals in adjacent tracks with their respective synchronizing signals aligned in the direction at right angles to the length of the tracks and further with carrier components of the signals recorded in the adjacent tracks being of the same frequency and having the same phase relation to the effective scanning direction during recording. During reproduction of the signals thus recorded, non-interfering signals recorded in two or more adjacent tracks are simultaneously reproduced, for example, as by a reproducing magnetic head having a gap width substantially greater than the pitch of the successive tracks in which the signals are magnetically recorded, so as to enhance the resolution and S/N ratio of the reproduced signals and further to avoid the necessity of a servo tracking arrangement.

44 Claims, 8 Drawing Figures

APPARATUS AND METHOD FOR RECORDING AND REPRODUCING A VIDEO SIGNAL IN SUCCESSIVE RECORD TRACKS ON A RECORD SHEET WITHOUT GUARD BANDS BETWEEN ADJACENT TRACKS

BACKGROUND OF THE INVENTION

1. Field of the Invention

This invention relates generally to the recording and reproducing of visual image or video signals, and more particularly is directed to the recording and reproducing of such signals on a record medium sheet which may be either circular or oblong.

2. Description of the Prior Art

In existing systems for recording and/or reproducing a visual image or video signal on a magnetic record medium, such as, a magnetic tape, successive fields or frames of the video signal are recorded along respective record tracks which extend obliquely across the tape, with guard bands or spaces being provided between the successive record tracks on the record medium so that, when the recorded video signal is being reproduced by a magnetic reproducing head or heads scanning the tracks in succession, the signal being reproduced during the scanning of one of the tracks will not be deteriorated by cross-talk from the signal from the signal recorded in the next adjacent trakcs. The width of each of the guard bands or unrecorded spaces between adjacent tracks is usually selected to be from 50 to 100 percent of the width of the record tracks with the result that from 30 to 50 percent of the area of the record medium is wasted, that is, not occupied by recorded signals. Thus, even in the case of recording video signals on magnetic tape, a relatively large length of the magentic tape is required for the recording of each unit period of time of the video signal and, by reason of the inherent limitation of the length of the tape that may be wound on a single reel, the video signal cannot be recorded for a long period of time without interruption. Even more severe limitations are imposed on the length of time during which a video signal can be recorded without interruption when the record medium is in the form of a disc of magnetic sheet material having a spiral record track with the guard bands being provided between adjacent turns of the sprial track or in the form of an oblong of magnetic sheet material having a series of record tracks extending generally parallel to its major axis with guard bands between such tracks.

Further, in the existing systems, as described above, it is customary to provide a servo tracking arrangement by which each reproducing head is made to scan accurately along a record track so that the previously mentioned guard bands can protect against the simultaneous reproduction of signals recorded in two adjacent tracks which would cause interference, for example, in the form of a beat.

SUMMARY OF THE INVENTION

Accordingly, an object of this invention is to provide an improved system for recording and/or reproducing a video signal on a record medium sheet, and which avoids the above mentioned disadvantages and existing systems.

Another object is to provide a system for recording and/or reproducing a video signal on a record sheet medium, and wherein the utilization efficiency of the record medium is increased without resultant interference between the signals recorded and reproduced in adjacent record tracks.

Still another object is to provide a system for magnetic recording and/or reproducing of a video signal on a magnetic record sheet, and wherein the video signal recorded on the magnetic record sheet is reproduced without requiring a servo tracking arrangement to align the scanning paths of the magnetic reproducing head relative to the record track.

A further object of this invention is to provide a system for magnetic recording and/or reproducing of a video signal on a magentic record sheet, and wherein the successive record tracks have no guard bands therebetween, or even overlap, to enhance the utilization of the record sheet for the recording of signals thereon, while avoiding any interference between signals recorded in the adjacent tracks during reproduction thereof.

A still further object is to provide a system for magnetic recording and reproducing of a video signal on a magnetic record sheet, as aforesaid, and in which the recorded signal is reproduced with high resolution and S/N ratio.

In accordance with an aspect of this invention, video signals are recorded in successive record tracks on a record sheet without guard bands or spaces between the successive tracks so as to fully utilize the area of the record sheet for recording of video signals, and the video signals recorded in adjacent tracks have their respective synchronizing signals aligned in the direction at right angles to the legnth of the tracks and further have carrier components of the same frequency and of the same phase relation to the effective scanning direction during recording so that, during reproduction of the recorded video signals, interference will not exist between signals that may be reproduced from adjacent tracks. In fact, during reproduction, the recorded tracks are preferably scanned along an area of substantially greater width than the pitch of the record tracks so as to ensure the reproduction of the successively recorded signals without the need for providing a servo tracking arrangement. In thus reproducing the recorded signals, signals are simultaneously reproduced from at least two adjacent tracks without interference between the reproduced signals so as to provide high resolution and S/N ratio.

The above, and other objects, features and advantages of this invention, will be apparent in the following detailed description of illustrative embodiments which is to be read in connection with the accompanying drawings.

DESCRIPTION OF THE PREFERRED EMBODIMENTS

Figure 1:
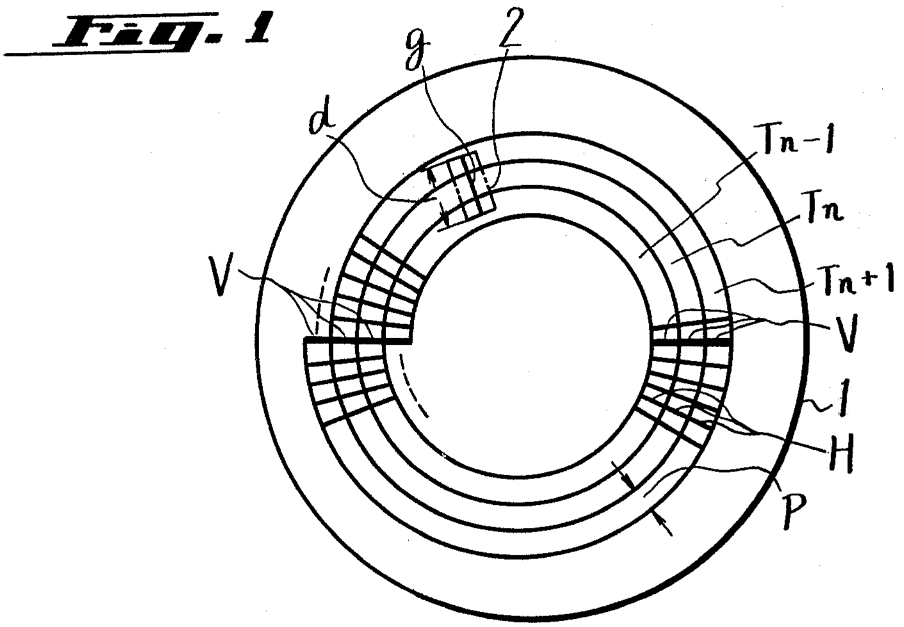
FIG. 1 is a schematic plan view of one embodiment of a magnetic recording disc having a spiral record tracks and showing a signal reproducing head thereon for use in accordance with the invention.

Referring to the drawings in detail, and initially to FIG. 1 thereof, it will be seen that the record medium for use in accordance with one embodiment of this invention is there shown in the form of a record disc 1 of magnetic sheet material. Video signals are recorded on magnetic record disc 1 by means of a magnetic recording head (not shown) which is disposed against the surface of disc 1 with the gap of the head extending radially in respect to the center of the record disc, and with suitable conventional mechanisms (not shown) being provided to move the recording head radially in respect to disc 1 while the latter is rotated. Thus, during each revolution of record disc 1, the video signal supplied to the recording head is recorded in a spiral track, for example, the spiral record track $T_n$, which is joined, at its ends, to the adjacent spiral record tracks $T_{n-1}$ and $T_{n+1}$ so that the successive spiral record tracks will form successive turns of a continuous spiral record track. The pitch P of the successive spiral record tracks is determined by the rotational speed of disc 1 and the speed of the radial movement of the recording head. In accordance with this invention, the successive spiral record tracks $T_{n-1}$, $T_n$, $T_{n+1}$,- - - etc. are formed on record disc 1 without guard bands or spaces therebetween, for example, by providing the magnetic recording head with a gap width equal to the pitch P of the spiral record tracks. Further, the rotational speed of record disc 1 during recording is selected so that each of the spiral record tracks will have recorded therein a video signal corresponding to a respective frame or field of the video signals being recorded. Thus, for example, magnetic record disc 1 may be rotated at a speed of 30 r.p.s. so that each of the spiral tracks $T_{n-1}$, $T_n$, $T_{n+1}$ - - - etc. will have recorded therein the video signal corresponding a respective frame, with the vertical synchronizing signals V and the horizontal synchronizing signals H of the video signal recorded in each spiral record track being aligned, in the radial direction of disc 1, that is, in the direction at right angles to the length of the record tracks, with the vertical and horizontal synchronizing signals V and H of the video signals recorded in the adjacent spiral tracks, as shown on FIG. 1.

The video signals recorded on the magnetic record disc 1, as aforesaid, are reproduced by means of a magnetic reproducing head 2 which, in accordance with this invention, has the width $d$ of its gap $g$ substantially greater than, and preferably equal to two times the pitch or width P of the successive spiral record tracks $T_{n-1}$, $T_n$, $T_{n+1}$ - - - etc. Accordingly, when the record disc 1 is rotated and the reproducing head 2 is radially moved during reproducing to more or less scan the spiral record tracks in succession, such reproducing head will, at any instant, scan the full width of one of the spiral record tracks and portions of the two adjacent spiral record tracks for simultaneously reproducing signals therefrom. More specifically, as shown on FIG. 2 in which a portion of the record disc 1 of FIG. 1 is shown enlarged and projected so that the several record tracks appear rectilinear, when head 2 is positioned so that its gap $g$ scans the full width of track $T_n$, the gap $g$ will also extend across and scan portions of the widths of the adjacent tracks $T_{n-1}$ and $T_{n+1}$.

In the above description, it has been assumed that separate magnetic heads are employed for recording and reproducing, respectively, the video signals on record disc 1 of FIG. 1, with the recording head having a gap width equal to the pitch P of the successive spiral record tracks and with the reproducing head 2 having a gap width $d$ equal to about two times the pitch P. However, similar results can be achieved by employing the same magnetic head for both recording and reproducing operations. More specifically, as shown on FIG. 3, recording of video signals on a record sheet MS may be effected with a magnetic head MH having a gap $g$ with a width substantially greater than, for example, two times, the desired width or pitch P of the successive record tracks $t_{n-1}$, $t_n$, $t_{n+1}$ - - - etc. With the foregoing arrangement, during recording, head MH is moved relative to record sheet MS in the direction indicated by the arrow S so as to record one frame or field of a video signal in, for example, the track $t_n$. Thereafter, the head MH is shifted relative to record sheet MS by the pitch distance P in the direction at right angles to the arrow S so that the next record track $t_{n+1}$ having a field or frame of the video signal recorded therein will partially overlap the previously recorded track $t_n$. In the area of such overlap, the signal previously recorded in the track $t_n$ is erased and replaced by the signal being recorded in the track $t_{n+1}$. Experiments that have been conducted indicate that, when the successive record tracks are overlapped, as aforesaid, the previously recorded signal has substantially no affect on the signal recorded thereover. At the completion of the recording operation illustrated on FIG. 3, the successive record tracks $t_{n-1}$, $t_n$, $t_{n+1}$ - - - etc. each having a frame or field of a video signal recorded therein, have a pitch or width P that is substantially smaller than, for example, one-half the gap width of magetic head MH. Thereafter, during reproducing of the signals recorded on record sheet MS, the same magnetic head MH can be used to succcessively scan the record tracks in the manner described above with reference to FIG. 2, that is, to fully scan the width of one record track $t_n$ while simultaneously scanning portions of the widths of the adjacent record tracks $t_{n-1}$ and $t_{n+1}$.

Figure 4:
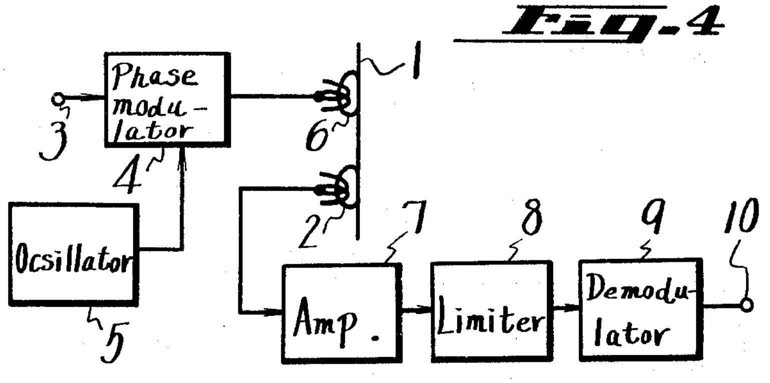
FIG. 4 is a schematic block diagram of a circuit for use in a video recording and/or reproducing apparatus according to this invention.

During the recording operation, the video signal is modulated, for example, phase modulated, before being recorded. Thus, during the reproducing operation, the reproduced signal is demodulated to obtain the reproduced video signal. For example, as shown on FIG. 4, the video signal, which is to be recorded, is fed to an input terminal 3 and, from the latter, is applied to a phase modulator 4 to phase-modulate the carrier signal derived from an oscillator 5. The phase-modulated signal is fed to a recording magnetic head 6 and then recorded on the magnetic sheet or record disc 1 in the manner described above. During reproduction, the signal picked up by the reproducing magnetic head 2 is applied through an amplifier 7 and then a limiter 8 to a demodulator 9. The demodulated output from the demodulator 9 is delivered to an output terminal 10.

Figure 2:
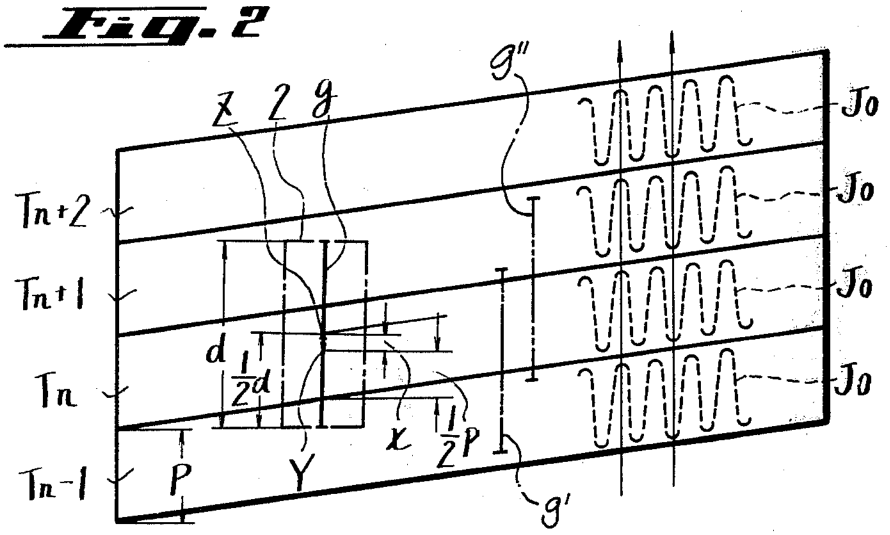
FIG. 2 is an enlarged projected view showing the positional relationship between adjacent spiral tracks and the signal reproducing head, and the signal carrier to be recorded in such adjacent spiral tracks on the recording disc shown in FIG. 1.
Figure 3:
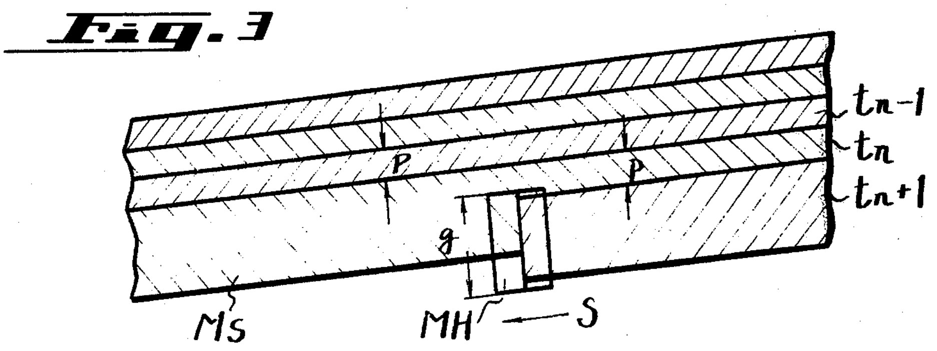
FIG. 3 is an enlarged diagrammatic view to which reference will be made in explaining recording of a video signal on a record medium sheet.

In accordance with this invention, the oscillator 5 is suitably driven in synchronism with the rotation of record disc 1 during recording operation so that the carrier components of the phase-modulated signals recorded in the successive record tracks $T_{n-1}$, $T_n$, $T_{n+1}$ - - - etc., and represented by broken lines at $J_o$ on FIG. 2, will have the same frequency and will be substantially in phase alignment. In other words, the carrier components $J_o$ of the phase-modulated signals recorded in the successive spiral record tracks on the disc 1 of FIG. 1 will be aligned with each other in the radial direction.

Further, in accordance with the invention, the modulation index $m$ of the phase-modulated signal which is recorded is preferably made smaller than approximately 1.3, and in any case less than 2.405, for reasons hereinafter explained.

The modulation index $m$, in the case of phase modulation, is expressed as a radian corresponding to the phase deviation of the modulated carrier relative to the unmodulated carrier and varies in accordance with the instantaneous value of the modulated carrier signal at the respective time points thereof. Accordingly, the fact that the modulation index $m$ is made less than 1.3, for example, about 1.0, means that upon phase demodulation of the reproduced signals, the phase deviation is 1 radian at most.

Figure 5:
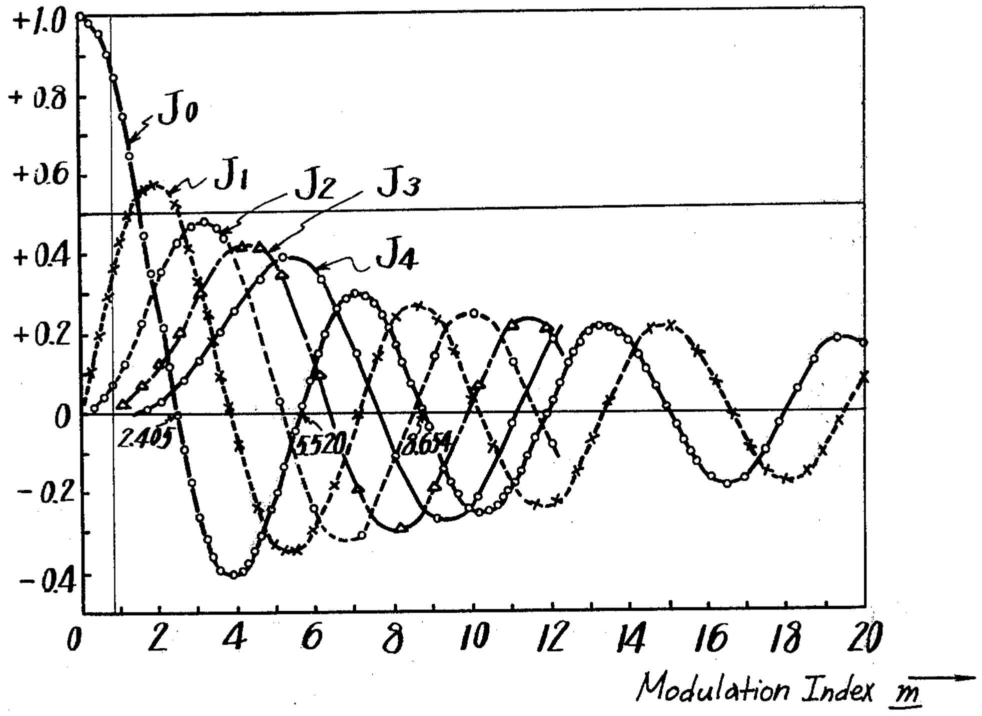
FIG. 5 is a graphical illustration of a Bessel function.

The phase-modulated carrier signal is expressed as a Bessel function of the sum of the carrier $J_o$ and the upper and lower side band components of first, second and third order signals $J_1$, $J_2$, $J_3$, . . . , as shown on FIG. 5, where the values of the carrier and the side band components are indicated as ordinates and the values of the modulation index $m$ are plotted on the abscissa.

It will be seen from FIG. 5 that, when the modulation index $m$ is made smaller than 1.3, for example, about 1.0, the second and higher order side band components become sufficiently small and hence can be neglected. Further, the amplitude of carrier $J_o$ can be considered constant irrespective of the value of modulation index $m$ or the instantaneous value of the modulating signal at the respective time points of the modulating signal. The foregoing results from the fact that the phase of composite signal $J_1$ of first order upper and lower side band components is always shifted or deviated in phase by 90° from the carrier $J_o$. However, due to the fact that the amplitude of first order side band component $J_1$, which is shifted in phase by 90°, is changed in accordance with the value of the modulating signal at the respective time points, as shown in FIG. 5, the phase deviation of the modulated signal, as a composite signal of carrier $J_o$ and first order side band component $J_1$, relative to the carrier is also changed.

Figure 6:
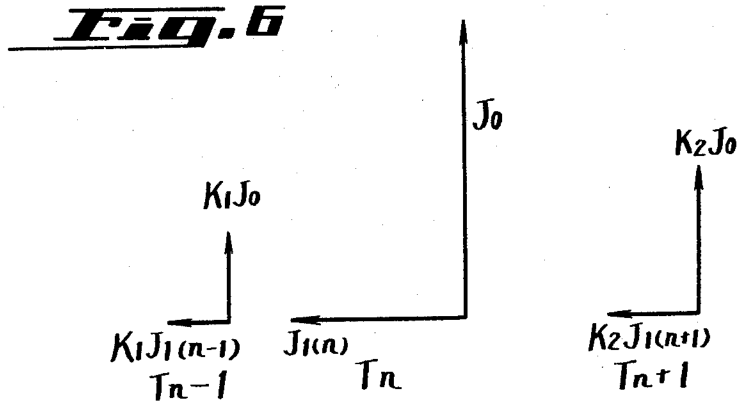
FIG. 6 shows phasor diagrams for the carrier and the first phase modulated side band.

Accordingly, as shown on FIG. 2, if the center Z of the gap $g$ of head 2 is shifted from the center Y of track $T_n$ by the distance $x$, the gap $g$ of head 2 scans the width $$\frac{d-P}{2}-x$$

of track $T_{n-1}$, and scans the width $$\frac{d}{2}-\left(\frac{P}{2}-x\right)=\frac{d-P}{2}+x,$$

of track $T_{n+1}$. Therefore, the scanning ratios $K_1$ and $K_2$ for the tracks $T_{n-1}$ and $T_{n+1}$, respectively can be expressed as:

$$\frac{\frac{d-P}{2}-x}{P}=K_1 \text{ and } \frac{\frac{d-P}{2}+x}{P}=K_2,$$

due to the fact that the carrier $J_o$ is recorded in the successive tracks $T_{n-1}$, $T_n$, $T_{n+1}$ - - - etc. with substantially the same amplitude, and with the phases of the carrier in adjacent tracks being coincident in the radial direction, that is, at right angles to the scanning direction. Thus, the amplitude of the carrier component in the reproduced signal from head 2 is a composite of components of the carrier shown in FIG. 6, and hence $$K_1J_o+J_o+K_2J_o=\frac{d}{P}J_o$$

is satisfied. Since irrespective of the position of head 2, the relationship between the total width $d$ of gap $g$ and the track pitch P is constant, the above composite of the components of the carrier has a constant value. The amplitudes of the first side bands in the tracks $T_{n-1}$, $T_n$ and $T_{n+1}$ change in a direct 1:1 ratio in accordance with the instantaneous values of the video signals recorded, as a modulating wave, in the respective tracks, and are different from each other as expressed by $J_{1(n-1)}$, $J_{1(n)}$ and $J_{1(n+1)}$ on FIG. 6. Accordingly, the amplitude of the first side band component in the reproduced signal from the head 2 is expressed by $$K_1 \cdot J_{1(n-1)} + J_{1(n)} + K_2 \cdot J_{1(n+1)}.$$

With the first side band component being taken into consideration, the composite signal reproduced by head 2 from signals having the level ratio $K_1$:1:$K_2$ and which are the video signals recorded at equal level in the respective tracks $T_{n-1}$, $T_n$ and $T_{n+1}$ after being separately phase-modulated, is substantially equal to the composite signal that would be reproduced if the entire widths of the tracks $T_{n-1}$, $T_n$ and $T_{n+1}$ were scanned and the signals recorded in such tracks were carrier signals phase-modulated with video signals with the level ratio $K_1$:1:$K_2$, respectively. Thus, when the reproduced signal from head 2 is demodulated, as described above, the demodulated signal that results is substantially equivalent to the composite signal that would result from combining the unmodulated video signals at predetermined level ratio therebetween corresponding to the position of head 2. In other words, the carrier components $J_o$ and the composite reproduced signals from the first order side band components $J_1$ are equivalent to the case where the video signal is composed optically, or where the video signal is recorded on a tape by a so-called direct recording method that is, without being modulated as in the case of an audio signal, and then is reproduced. The signal components higher than the second order side band components can be similarly treated.

Even if the head gap $g$ of reproducing head 2 is shifted relative to track $T_n$, for example, either of the positions shown in broken lines at $g'$ and $g''$, no beat due to cross-talk between adjacent tracks is generated. Thus, predetermined reproduced video signals are obtained with a so-called tracking servo arrangement not being required for signal reproduction, and with the utilization of the recording area of the sheet being greatly increased because no guard bands are formed between adjacent record tracks. Since no attention need by paid to the tracking accuracy, the width of head gap $g$ of reproducing head 2, and hence also the width P of the tracks can be narrowed to very substantially increase the time period during which video signals may be recorded without interruption.

Further, since in accordance with the present invention, the gap width of reproducing head 2 is selected to be much wider than the record track pitch P, for example, more than twice as wide, the reproducing head simultaneously reproduces signals recorded on the adjacent tracks with the result that a picture can be reproduced with improved S/N ratio and high resolution.

Although the composite signals composed of signals recorded on adjacent tracks are sequentially reproduced, this fact does not present any substantial problem from the practical point of view.

As the modulation index $m$ increases, the amplitude of carrier $J_0$ in the modulated wave decreases gradually and cannot be deemed constant, as may be apparent from FIG. 5. As a result, the values of the video signal, that is, the modulating signal, at the respective points in time do not correspond linearly to the amplitude of the first order side band component. However, if this deterioration of linearity is tolerated to some extent, it would not present any problem within the range where the amplitude of carrier $J_0$ is not decreased below the point at which the modulation index $m$ exceeds 1.3. In theory, within the range where the carrier $J_0$ does not drop out (that is, the modulation index $m$ is smaller than 2.405), phase modulation can be achieved. In practice, it is preferred that the modulation index $m$ be in the vicinity of 1.0 (which, as an angle, is about 75°).

Figure 7:
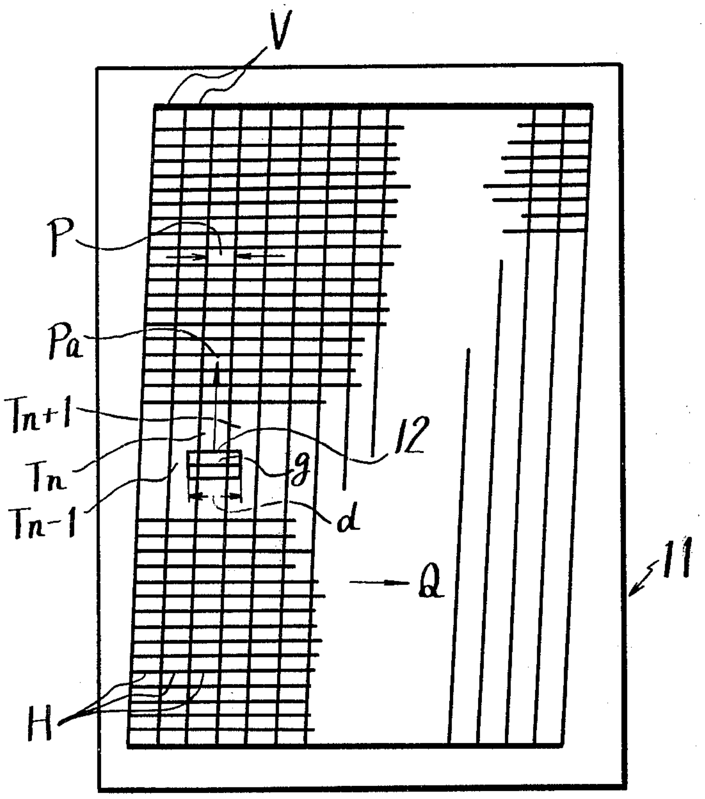
FIG. 7 is a plan view of another embodiment of a magnetic record sheet having plural record tracks thereon and also showing a signal reproducing head for use in accordance with the invention.

Referring now to FIG. 7, it will be seen that the record medium for use in accordance with another embodiment of this invention is there shown to be in the form of an oblong or rectangular magnetic sheet 11 on which video signals are recorded in successive record tracks $T_{n-1}$, $T_n$, $T_{n+1}$, . . . etc. which extend generally in the direction of the major axis of the oblong record sheet 11 and which are formed without guard bands or spaces between the adjacent record tracks. As in the previously described embodiment, each of the record tracks on record sheet 11 has recorded therein a video signal corresponding to a respective frame or field of the video signals being recorded, with the vertical synchronizing signals V and the horizontal synchronizing signals H of the video signals recorded in adjacent record tracks being aligned, in the direction at right angles to the length of the record tracks.

In reproducing the video signals recorded in the record tracks on record sheet 11, a magnetic reproducing head 12 having a gap $g$ of a width $d$ substantially greater than, for example, two times the width or pitch P of the record tracks is moved parallel to the major axis of oblong record sheet 11 while the latter is moved at right angles thereto in the direction of the arrow $q$ so that the reproducing head 12 will move effectively in the direction of the arrow $P_n$ so as to scan the full width of one of the record tracks, for example, the record track $T_n$, and also scan portions of the widths of the adjacent tracks $T_{n-1}$ and $T_{n+1}$, as previously described herein. When reproducing head 12 reaches the end of record track $T_n$, another similar magnetic reproducing head (not shown) commences its movement along the next record track $T_{n+1}$.

Figure 8:
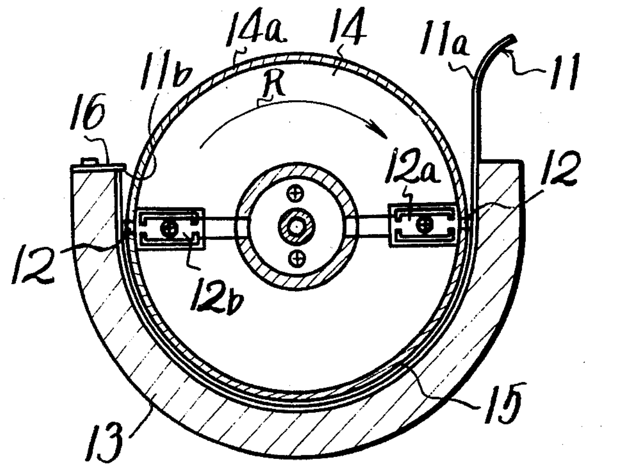
FIG. 8 is a vertical cross-sectional view of a transversescan rotary head assembly that may be used according to this invention in connection with the record sheet of FIG. 7.

As shown on FIG. 8, an apparatus for recording and/or reproducing video signals on the oblong record sheet 11 of FIG. 7 may include a substantially semi-cylindrical record sheet guide 13 which extends around the lower portion of a rotatable guide drum 14 with a clearance or gap 15 being defined between guide 13 and the outer surface 14*a* of drum 14. Diametrically opposed magnetic head assemblies 12*a* and 12*b* are mounted in drum 14 for rotation with the latter and include head chips 12 which extend from the outer surface 14*a* of the drum for contacting the magnetic coated surface 11*a* of the record sheet 11 when the latter is inserted into clearance or gap 15 so as to engage one of its end edges 11*b* against a stop 16 provided on guide 13. During recording or reproducing operations, drum 14 is rotated, for example, in the direction of the arrow R and the record sheet 11 in clearance or gap 15 is simultaneously moved in a direction parallel to the axis of rotation of drum 14, for example, by a suitable mechanism displacing guide 13 axially relative to drum 14. The rotational speed of drum 14 is selected, for example, drum 14 is rotated at a speed of 30r.p.s., so that the heads 12*a* and 12*b* will alternately each record or reproduce a video signal corresponding to a respective field in a record track extending generally longitudinally on sheet 11, as shown on FIG. 7. The speed of movement of record sheet 11 in the direction of the rotational axis of drum 14 is selected in relation to the rotational speed of the drum so as to attain the desired width or pitch P of the successive record tracks which is, in accordance with this invention, substantially smaller than, for example, one-half, the gap width of the head chip 12 of each of the head assemblies 12*a* and 12*b*. In the case where the head assemblies 12*a* and 12*b* are used for both recording and reproducing the video signals, the successive record tracks will be overlapped, during recording operation, so that the ultimate record tracks will have a width or pitch P smaller than the gap width of the magnetic heads, as has been described above with reference to FIG. 3.

In the apparatus of FIG. 8, the gap or clearance 15 between guide 13 and drum 14 is preferably made wider than the thickness of record sheet 11 so that, due to the inherent elasticity of the record sheet, the head chips 12 projecting from the outer surface 14*a* of drum 14 into contact with the magnetic coated surface 11*a* of the record sheet will depress or slightly deflect the record sheet at the regions of contact of the head chips therewith.

Although the present invention has been described above as being applied to the recording and reproducing of video signals on a record medium in the form of either a disc or an oblong sheet, it will be apparent that the invention is also applicable to the recording and reproducing of video signals in successive record tracks extending obliquely across a magnetic tape. Of course, when recording and reproducing video signals in oblique or skewed tracks on a magnetic tape, the usual guard bands or spaces between adjacent record tracks are omitted in accordance with this invention. Further, when applying the invention to the recording and reproducing of video signals in oblique or skewed tracks on a magnetic tape, the vertical and horizontal synchronizing signals in adjacent record tracks are aligned, the modulation index of the modulation of the video signals before recording is made small, and the recorded signals are reproduced with a reproducing head having a gap width substantially larger than the pitch or width of the successive record tracks, all as described above with reference to the illustrated embodiments of the invention.

As previously mentioned, the video signals are preferably phase-modulated before being recorded. However, the video signals may be recorded directly without being modulated, or recorded after being amplitude-modulated. However, if the video signals are recorded directly on the magnetic record medium, or recorded thereon after being amplitude-modulated, the reproduced video signals are subjected to amplitude variation as a result of the characteristics of the magnetic record medium, magnetic reproducing head and the amplifier, with the result that a so-called AM noise may be produced in the reproduced signals and thereby reduce the S/N ratio of the latter. On the other hand, when the video signals are recorded after being phase-modulated, the reproduced signals are passed through the limiter 8 (FIG. 4) prior to being applied to the demodulator 9, so that the previously mentioned amplitude variation can be eliminated.

If the video signals are frequency-modulated, rather than being phase-modulated, prior to the recording thereof, the modulation index, in the case of frequency-modulation, varies inversely to the frequency of the modulating video signals. By reason of such variation of the modulation index, the amplitude of the carrier $J_o$ cannot be made approximately constant, and the ratio of the amplitudes of the carrier $J_o$ and the components $J_1, J_2, J_3$ . . . is varied by the video signal so that the second and higher order components cannot be ignored, as previously described. On the other hand, when the video signals are phase-modulated prior to recording, as is preferred in accordance with this invention, the modulation index is independent of the frequency of the modulating video signals and may be made small so that the reproduced signal depends mainly on $J_o$ and the first order component $J_1$, without interference from the higher order components $J_2, J_3$ . . . , in order to attain a reproduced signal which, after demodulation, corresponds to the original video signals and is free of AM noise.

When a composite color video signal is being recorded, the luminance signal component is recorded after being phasemodulated as described above. On the other hand, the chrominance signal component, which is comprised of a chrominance subcarrier amplitude-modulated with a red color difference signal (R-Y) and a blue color difference signal (B-Y), is frequency converted to a lower frequency band prior to being added to the phase-modulated luminance signal for recording on the record medium with the frequency-converted chrominance subcarrier in adjacent record tracks being aligned in the same phase relation to the effective scanning direction of the recording head, as has been previously described in respect to the carrier of the phase-modulated signal.

In all of the foregoing, the invention has been described as applied to the magnetic recording and reproducing of video signals. However, in place of a magnetic record medium, the record medium may be constituted by a thin plastic foil in which grooves are formed with varying depths to constitute the record tracks having video signals recorded therein, with such recorded signals being reproduced by a diamond or other stylus moving along the successive record tracks and associated with a piezo-electric ceramic transducer or the like by which the resulting variations in the pressure on the pickup stylus are converted to a corresponding electric signal. The invention can also be applied to the electro-optical recording and reproducing of video signals, for example, in which the successive record tracks on the record medium have either variations in light reflectivity or transmission corresponding to the recorded signals therein.

The invention can be further applied to a record medium constituted by a vinyl base sheet having a coating of aluminum or copper thereon and a dielectric coating, such as, of polystyrene, on the aluminum or copper coating, in which case the video signals are recorded as variations in the capacitance along the successive record tracks. When reproducing such signals, the variations in capacitance between the electrode of a pickup head moving along the record tracks in succession and the aluminum or copper coating of the record medium are employed to produce an output signal corresponding to the original recorded video signals.

Although specific embodiments of the invention have been described above with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for recording and reproducing video signals having synchronizing signals denoting line and field intervals of said video signals, comprising a record medium, signal recording means arranged adjacent said record medium and receiving the video signals for recording on said record medium, said record medium and signal recording means being moved relative to each other so that the video signals are recorded on said record medium in successive record tracks which extend parallel to each other and have abutting longitudinal margins with said synchronizing signals of the video signals recorded in adjacent record tracks being aligned with each other in the direction at right angles to the length of said tracks, and at least one signal reproducing head moved relative to said record medium for scanning said record tracks in succession, said signal reproducing head having an effective width substantially greater than the width of each of said record tracks so as to simultaneously scan, and reproduce signals from, the full width of one of said record tracks and a portion of the width of at least one of the record tracks adjacent thereto.

2. An apparatus according to claim 1; further comprising means for phase-modulating a carrier signal with said video signals prior to the recording of the latter by said signal recording means; and in which said carrier signal, as recorded in said successive record tracks, is in substantial phase alignment.

3. An apparatus according to claim 2; in which the phase-modulated signal which results from the phase-modulation of said carrier signal with the video signals has a modulation index of less than 2.405.

4. An apparatus according to claim 3; in which said modulation index is less than 1.3.

5. An apparatus according to claim 3; further comprising limiter means receiving the reproduced phase-modulated signal from said signal reproducing head for eliminating AM noise, and demodulating means receiving the output of said limiter means for providing the reproduced video signals.

6. An apparatus according to claim 1; in which said record medium is magnetically sensitive, and said signal recording means and reproducing head include magnetic heads.

7. An apparatus according to claim 6; in which said magnetic head of at least said signal reproducing head has a gap width substantially greater than said width of each of said record tracks.

8. An apparatus according to claim 7; in which said gap width is two times the width of each of said record tracks.

9. An apparatus according to claim 7; in which the same magnetic head having a gap width substantially greater than the record track width is included in both said signal recording means and reproducing head, and, during recording, the successive areas of said record medium scanned by said magnetic head are in overlapping relation to define said record tracks having a width less than the gap width of said magnetic head.

10. An apparatus according to claim 1; in which said record medium is in the form of a disc, and said successive record tracks are in the form of successive spiral turns joined end-to-end.

11. An apparatus according to claim 1; in which said record medium is in the form of an oblong sheet and said parallel record tracks extend generally in the direction of a major axis of said oblong sheet.

12. An apparatus according to claim 11; further comprising a rotated guide drum having at least one head rotating therewith for recording and reproducing said signals, and means guiding said oblong sheet about said drum for movement relative to the latter in the direction of the axis of said drum.

13. A method of recording and reproducing video signals having synchronizing signals denoting line and field intervals of the video signals, comprising recording the video signals on a record medium in successive parallel record tracks which abut along their longitudinal edges and with the synchronizing signals of the video signals recorded in adjacent tracks being aligned in the direction at right angles to the length of the tracks, and scanning the successive record tracks over a width of said record medium substantially greater than the width of each of said record tracks so as to simultaneously scan, and reproduce signals from, the full width of one of said tracks and a portion of the width of at least one of the record tracks adjacent thereto.

14. The method according to claim 13; in which the video signals, as recorded, phase-modulate a carrier signal, and in which said carrier signal, as recorded in said successive record tracks, is in substantial phase alignment.

15. The method according to claim 14; in which the recorded phase-modulated signal has a modulation index of less than 2.405.

16. The method according to claim 15; in which said modulation index is less than 1.3.

17. The method according to claim 14; in which the reproduced signal is limited prior to being demodulated so as to obtain substantially the original video signals without AM noise.

18. The method according to claim 13; in which the record medium is magnetically sensitive and the recording and reproducing of signals thereon is effected by means of magnetic heads, and in which the magnetic head used for reproducing the recorded signals has a gap width substantially greater than the width of said record tracks.

19. The method according to claim 18; in which said gap width is two times said width of the record tracks.

20. Apparatus for recording video signals having synchronizing signals denoting line and field intervals of said video signals, comprising a record medium and signal recording means arranged adjacent said record medium and receiving the video signals for recording on said record medium, wherein said record medium is magnetically sensitive and said signal recording means includes magnetic head means, said medium and magnetic head means being moved relative to each other so that the video signals are recorded on said record medium in successive record tracks which extend parallel to each other and have abutting longitudinal margins with said synchronizing signals of the video signals recorded in adjacent record tracks being aligned with each other in the direction at right angles to the length of said tracks, said magnetic head means having a gap width substantially greater than the width of each of said record tracks.

21. Apparatus according to claim 20 wherein the successive areas of said record medium scanned by said magnetic head means are in overlapping relation to define said record tracks having a width less than the gap width of said magnetic head means.

22. Apparatus according to claim 21 in which said gap width is two times the width of each of said record tracks.

23. Apparatus according to claim 20 in which said record medium is in the form of a disc, and said successive record tracks are in the form of successive spiral turns joined end-to-end.

24. Apparatus according to claim 20 in which said record medium is in the form of an oblong sheet and said parallel record tracks extend generally in the direction of a major axis of said oblong sheet.

25. Apparatus according to claim 24 in which said signal recording means includes a rotated guide drum having head means rotating therewith, and means guiding said oblong sheet about said drum for movement relative to the latter in the direction of the axis of said drum.

26. A method of recording video signals having synchronizing signals denoting line and field intervals of the video signals, comprising the steps of providing relative motion between a recording head and a recording medium so that said head scans successive record tracks over a width of said record medium substantially greater than the width of each of said record tracks so as to scan the full width of one of said tracks and a portion of the width of at least one of the record tracks adjacent thereto; and supplying video signals to said recording head to thereby record video signals on said record medium in successive parallel record tracks which abut along their longitudinal edges and with the synchronizing signals of the video signals recorded in adjacent tracks being aligned in the direction at right angles to the length of the tracks.

27. The method according to claim 26 in which the step of supplying video signals to said recording head includes phase modulating a carrier signal with said video signals so that said carrier signal, as recorded in said successive record tracks, has the same phase relation to the lengths of the tracks.

28. The method according to claim 27 in which the recorded phase-modulated signal has a modulation index of less than 2.405.

29. The method according to claim 28 in which said modulation index is less than 1.3.

30. The method according to claim 29 in which the record medium is magnetically sensitive and the recording of signals thereon is effected by means of a magnetic head.

31. Apparatus for reproducing from a record medium video signals having synchronizing signals denoting line and field intervals of said video signals, said video signals having been recorded on said record medium in successive record tracks which extend parallel to each other and have abutting longitudinal margins with said synchronizing signals of the video signals recorded in adjacent record tracks being aligned with each other in the direction at right angles to the length of said tracks, comprising at least one signal reproducing head moved relative to said record medium for scanning said record tracks in succession, said signal reproducing head having an effective width substantially greater than the width of each of said record tracks so as to simultaneously scan, and reproduce signals from, the full width of one of said record tracks and a portion of the width of at least one of the record tracks adjacent thereto.

32. Apparatus according to claim 31 wherein said recorded video signals comprise a carrier signal phase-modulated with video signals; said carrier signal, as recorded in said successive record tracks, having the same phase relation to the lengths of said record tracks; and further comprising limiter means receiving the reproduced phase-modulated signal from said signal reproducing head for eliminating AM noise, and demodulating means receiving the output of said limiter means for providing the reproduced video signals.

33. Apparatus according to claim 31 in which said record medium is magnetically sensitive, and said signal reproducing means includes magnetic head means.

34. Apparatus according to claim 33 in which said magnetic head means has a gap width substantially greater than said width of each of said record tracks.

35. Apparatus according to claim 31 in which said record medium is in the form of a disc, and said successive record tracks are in the form of successive spiral turns joined end-to-end.

36. Apparatus according to claim 35 in which said gap width is two times the width of each of said record tracks.

37. Apparatus according to claim 31 in which said record medium is in the form of an oblong sheet and said parallel record tracks extend generally in the direction of a major axis of said oblong sheet.

38. Apparatus according to claim 37 in which said signal reproducing apparatus includes a rotated guide drum having at least one head rotating therewith, and means guiding said oblong sheet about said drum for movement relative to the latter in the direction of the axis of said drum.

39. A method of reproducing video signals having synchronizing signals denoting line and field intervals of the video signals, said video signals having been recorded on a magnetic medium in successive parallel record tracks which abut along their longitudinal edges and with the synchronizing signals of the video signals recorded in adjacent tracks being aligned in the direction at right angles to the length of the tracks, comprising scanning the successive record tracks over a width of said magnetic medium substantially greater than the width of each of said record tracks by a magnetic head having a gap width substantially greater than the width of each record track so as to simultaneously scan, and reproduce signals from, the full width of one of said tracks and a portion of the width of at least one of the record tracks adjacent thereto.

40. The method according to claim 39 in which the recorded video signals comprise a phase-modulated carrier signal, said carrier signal, as recorded in said successive record tracks, has the same phase relation to the lengths of the tracks, and in which the reproduced signal is limited prior to being demodulated so as to obtain substantially the original video signals without AM noise.

41. The method according to Claim 39 in which said gap width is two times said width of the record tracks.

42. An apparatus for recording video signals having synchronizing signals denoting line and field intervals of said video signals, comprising: a record medium, signal recording means arranged adjacent said record medium and receiving the video signals for recording on said record medium, said record medium and signal recording means being moved relative to each other; and means for phase modulating a carrier signal with said video signals prior to the recording of said video signals by said signal recording means, said carrier signal having the same relative phase at a predetermined portion of each of successive tracks so that said phase modulated video signals are recorded on said record medium in substantial phase alignment in successive record tracks which record tracks extend parallel to each other and have abutting longitudinal margins such that said synchronizing signals of said video signals are recorded in adjacent record tracks and are aligned with each other in the direction at right angles to the length of said tracks.

43. Apparatus according to claim 42 in which the phase-modulated signal which results from the phase-modulation of said carrier signal with the video signals has a modulation index of less than 2.405.

44. Apparatus according to claim 43 in which said modulation index is less than 1.3.

* * * * *

UNITED STATES PATENT OFFICE

CERTIFICATE OF CORRECTION

Patent No. 3,911,483 Dated October 7, 1975

Inventor(s) Nobutoshi Kihara, Yukihiko Machida

It is certified that error appears in the above-identified patent and that said Letters Patent are hereby corrected as shown below:

Column 1, line 26 delete "from the signal" (first occurrence
Column 1, line 27 change "trakcs" to --tracks--;
Column 1, line 45, change "sprial" to --spiral--.
Column 2, line 10 change "track" to --tracks--;
Column 2, line 13, change "magentic" to --magnetic--

Column 4, line 49, change "magetic" to --magnetic--.
Column 6, line 10, second equation, change $$\frac{\frac{d-p}{2} - x}{2} = K_1 \quad \text{and} \quad \frac{d-p}{2} + x \; p = K_2,$$

to: --

$$\frac{\frac{d-p}{2} - x}{P} = K_1 \quad \text{and} \quad \frac{\frac{d-p}{2} + x}{P} = K_2$$

Claim 30, should be changed to dependency "29" to --26--

Signed and Sealed this

*eighteenth* Day of *May 1976*

[SEAL]

*Attest:*

RUTH C. MASON
*Attesting Officer*

C. MARSHALL DANN
*Commissioner of Patents and Trademarks*

Notice of Adverse Decision in Interference

In Interference No. 99,769, involving Patent No. 3,911,483, N. Kihara and Y. Machida, APPARATUS AND METHOD FOR RECORDING AND REPRODUCING A VIDEO SIGNAL IN SUCCESSIVE RECORD TRACKS ON A RECORD SHEET WITHOUT GUARD BANDS BETWEEN ADJACENT TRACKS, final judgment adverse to the patentees was rendered Mar. 17, 1980, as to claims 2, 4–8, 11–15, 17, 19–22 and 24.

[*Official Gazette September 30, 1980.*]

Disclaimer 3,911,483.—*Nobutoshi Kihara*; and *Yukihiko Machida*, Tokyo, Japan. APPARATUS AND METHOD FOR RECORDING AND REPRODUCING A VIDEO SIGNAL IN SUCCESSIVE RECORD TRACKS ON A RECORD SHEET WITHOUT GUARD BANDS BETWEEN ADJACENT TRACKS. Patent dated Oct. 7, 1975. Disclaimer filed Jan. 15, 1981, by the assignee, *Sony Corporation.*

Hereby enters this disclaimer to claims 1, 6, 7, 8, 9, 10, 13, 18, 20, 21, 23, 26, 30, 31, 33, 34, 35 and 39 of said patent.

[*Official Gazette March 3, 1981.*]